(12) United States Patent
Yeh

(10) Patent No.: US 11,531,388 B2
(45) Date of Patent: Dec. 20, 2022

(54) ELECTRONIC APPARATUS AND POWER MANAGEMENT METHOD THEREOF

(71) Applicant: Acer Incorporated, New Taipei (TW)

(72) Inventor: Shu-Wei Yeh, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/950,917

(22) Filed: Nov. 18, 2020

(65) Prior Publication Data

US 2022/0019275 A1 Jan. 20, 2022

(30) Foreign Application Priority Data

Jul. 14, 2020 (TW) .................................. 109123750

(51) Int. Cl.
*G06F 1/32* (2019.01)
*G06F 3/02* (2006.01)
*G06T 1/20* (2006.01)
*G06F 1/324* (2019.01)
*G06F 1/3234* (2019.01)
*G06F 1/329* (2019.01)
*G06F 1/3212* (2019.01)

(52) U.S. Cl.
CPC .............. *G06F 1/324* (2013.01); *G06F 1/329* (2013.01); *G06F 1/3212* (2013.01); *G06F 1/3265* (2013.01); *G06F 1/3271* (2013.01); *G06F 3/0227* (2013.01); *G06T 1/20* (2013.01)

(58) Field of Classification Search
CPC ...... G06F 1/3212; G06F 1/324; G06F 1/3265; G06F 1/3271; G06F 1/329; G06F 1/3296
See application file for complete search history.

(56) References Cited

U.S. PATENT DOCUMENTS

| 8,332,678 B1* | 12/2012 | Mahalingam | G06F 1/3212 |
| | | | 713/340 |
| 8,515,499 B1* | 8/2013 | Stekkelpak | G06F 1/3203 |
| | | | 455/574 |
| 10,261,564 B1* | 4/2019 | Gollakota | G06F 9/4451 |
| 10,884,475 B1* | 1/2021 | Wang | G01R 31/367 |
| 10,969,851 B2* | 4/2021 | Chan | G06F 1/3212 |
| 2007/0249395 A1* | 10/2007 | Kondo | H04N 21/440272 |
| | | | 455/556.1 |

(Continued)

FOREIGN PATENT DOCUMENTS

| CN | 103185867 | 7/2013 |
| CN | 108376028 | 10/2019 |

(Continued)

*Primary Examiner* — Ji H Bae
*Assistant Examiner* — Cheri L Harrington
(74) *Attorney, Agent, or Firm* — JCIPRNET

(57) ABSTRACT

An electronic apparatus and a power management method thereof are provided. The power management method is adapted to the electronic apparatus and includes the following steps. A target time is obtained according to a user input. A remaining demand time is determined according to the target time and an elapsed time after activating timing. A time-to-empty of a battery device is obtained. The time-to-empty of the battery device and the remaining demand time are compared to provide a visual notification and a user behavior suggestion message according to the comparison result. The user behavior suggestion message includes at least one power saving operation.

14 Claims, 4 Drawing Sheets

(56) References Cited

U.S. PATENT DOCUMENTS

| | | | |
|---|---|---|---|
| 2008/0165714 A1* | 7/2008 | Dettinger | H04W 52/0261 370/311 |
| 2010/0131791 A1* | 5/2010 | Kimura | G06F 1/3203 713/340 |
| 2011/0283121 A1* | 11/2011 | Kuroda | G06F 1/3203 713/310 |
| 2012/0210325 A1* | 8/2012 | de Lind van Wijngaarden | G06F 1/329 718/103 |
| 2013/0138989 A1* | 5/2013 | Jang | G06F 1/28 324/426 |
| 2013/0254773 A1* | 9/2013 | Kimura | G06F 9/4893 718/102 |
| 2014/0025322 A1* | 1/2014 | Yang | G06F 1/3234 702/63 |
| 2014/0068314 A1* | 3/2014 | Kim | G06F 1/28 713/340 |
| 2015/0000651 A1* | 1/2015 | Palacharla | G06F 1/263 324/427 |
| 2015/0089210 A1* | 3/2015 | Lai | G06F 9/4401 713/2 |
| 2015/0156307 A1* | 6/2015 | Kim | H04W 52/0251 455/566 |
| 2015/0198996 A1* | 7/2015 | Kliegman | G06F 1/3206 713/324 |
| 2015/0323974 A1* | 11/2015 | Shuster | G08B 21/182 713/320 |
| 2017/0185134 A1* | 6/2017 | Han | H02J 7/0071 |
| 2019/0086955 A1* | 3/2019 | Li | G06F 1/169 |
| 2019/0205214 A1* | 7/2019 | Morning-Smith | G06F 1/30 |
| 2019/0265773 A1* | 8/2019 | Sjödin | G08B 21/182 |
| 2019/0302863 A1* | 10/2019 | Chandra | G06F 1/3296 |
| 2020/0209941 A1* | 7/2020 | Shiba | H02J 7/0048 |
| 2020/0371576 A1* | 11/2020 | Tsirkin | G06F 1/3212 |

FOREIGN PATENT DOCUMENTS

| | | |
|---|---|---|
| TW | 201516648 | 5/2015 |
| TW | 584115 | 5/2017 |
| TW | 201931060 | 8/2019 |

* cited by examiner

ELECTRONIC APPARATUS AND POWER MANAGEMENT METHOD THEREOF

CROSS-REFERENCE TO RELATED APPLICATION

This application claims the priority benefit of Taiwan application serial no. 109123750, filed on Jul. 14, 2020. The entirety of the above-mentioned patent application is hereby incorporated by reference herein and made a part of this specification.

BACKGROUND

Technical Field

The disclosure relates to an electronic apparatus, and particularly relates to an electronic apparatus and a power management method thereof.

Description of Related Art

In the modern world, laptop computers have become common electronic apparatuses. Thanks to their portability, laptop computers can be operated at any place for work, entertainment or other activities. Laptop computers are different from ordinary desktop computers. In order to be operated at any place, laptop computers are equipped with batteries as the power source. In other words, when a laptop computer is not connected to an external power supply, the user relies on the battery power to maintain the operation of the laptop computer. Due to the limited power of the battery, the laptop computer is generally provided with a power management mechanism for managing the remaining operation time of the laptop computer so as to extend the time of operation. In current laptop computers, generally the user needs to click on the battery icon displayed on the desktop to know the remaining power and the estimated time-to-empty of the battery. In addition, the user may also click on the battery icon displayed on the desktop to set a power management plan. This way of providing battery information to the user in response to a user operation (for example, clicking on the battery icon on the desktop as described above) is passive and not instant.

However, in some application scenarios, the user needs to ensure that the remaining power of the battery is sufficient to complete the current operation. For example, the user may need to ensure that the remaining power of the battery is sufficient to complete an important presentation, finish playing a video, or complete a computer game, etc. In these application scenarios where it is required to ensure the time-to-empty of the battery, passive and non-instant provision of battery information may be inconvenient for the user. The user is required to repeatedly click on the icon to check the remaining power and the time-to-empty, and there is no way for the user to know how to adjust the user behavior to ensure that the remaining power of the battery is sufficient to complete the current operation.

SUMMARY

The disclosure provides an electronic apparatus and a power management method thereof, which instantly and actively provide the user with visualized remaining power information, allowing the user to intuitively adjust the behavior of operating the electronic apparatus so as to ensure that the remaining power of the battery is sufficient for the user to complete the current operation.

An embodiment of the disclosure provides a power management method, which is adapted to an electronic apparatus including a battery device. The power management method includes the following steps. A target time is obtained according to a user input. A remaining demand time is determined according to the target time and an elapsed time after activating timing. A time-to-empty of the battery device is obtained. The remaining demand time is compared with the time-to-empty of the battery device, and a visual notification and a user behavior suggestion message are provided according to a comparison result. Here, the user behavior suggestion message includes at least one power saving operation.

An embodiment of the disclosure provides an electronic apparatus, which includes an input device, a battery device, a storage device, and a processor. The input device receives a user input. The processor is coupled to the input device, the battery device, and the storage device, and is configured to perform the following steps. A target time is obtained according to the user input. A remaining demand time is determined according to the target time and an elapsed time after activating timing. A time-to-empty of the battery device is obtained. The remaining demand time is compared with the time-to-empty of the battery device, and a visual notification and a user behavior suggestion message are provided according to a comparison result. Here, the user behavior suggestion message includes at least one power saving operation.

Based on the above, in the embodiments of the disclosure, the remaining demand time is obtained according to the target time set by the user and the elapsed time after activating timing. By comparing the remaining demand time with the time-to-empty of the battery device, a visual notification and a user behavior suggestion message are provided according to the comparison result. By providing the visual notification and the user behavior suggestion messages according to the comparison result, the electronic apparatus can instantly and actively inform whether the remaining power of the battery is sufficient for the electronic apparatus to continue operating for the target time. Accordingly, the user may instantly adjust the user behavior to prolong the time-to-empty of the battery device so as to ensure that the time-to-empty of the battery device can meet the target requirement.

In order to make the above and other features and advantages of the disclosure more comprehensible, several exemplary embodiments are described in detail below with reference to the accompanying drawings.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
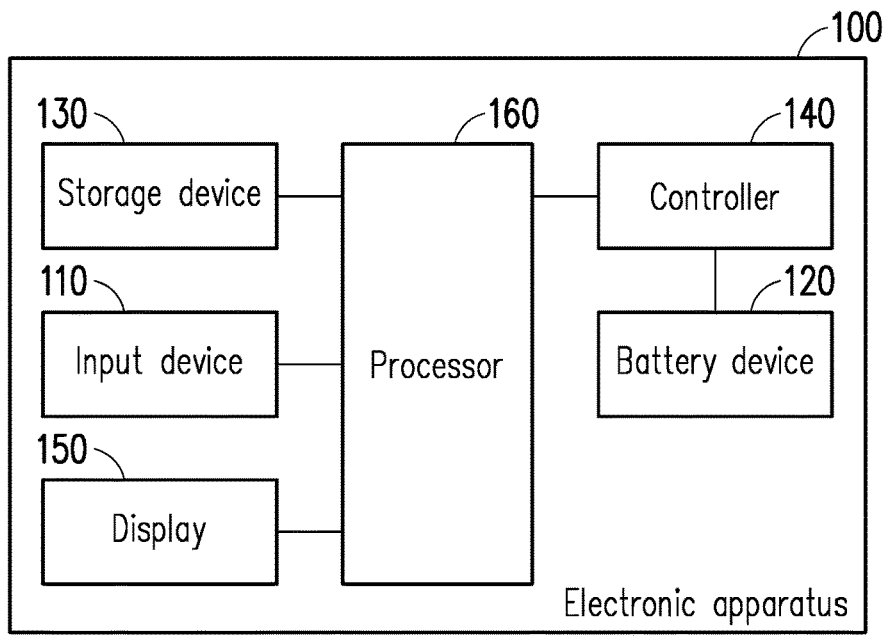
FIG. 1 is a block diagram of an electronic apparatus according to an embodiment of the disclosure.

Some exemplary embodiments of the disclosure will be described in detail hereinafter with reference to the accompanying drawings. Regarding the reference numerals in the following description, the same reference numerals that appear in different drawings will be regarded as referring to the same or similar components. These embodiments are only a part of the disclosure, and do not disclose all possible forms of the disclosure. More specifically, these embodiments are merely examples of the apparatus and method defined by the claims of the disclosure.

When a component is described as being "connected" or "coupled" to another component, it should be understood that the component may be connected or coupled to the another component directly or via an intervening component. However, when a component is described as being "directly connected" or "directly coupled" to another component, there is no intervening component.

FIG. 1 is a block diagram of an electronic apparatus according to an embodiment of the disclosure. Referring to FIG. 1, the electronic apparatus 100 may be an electronic apparatus that receives power supply from a battery, such as a laptop computer, a smart phone, a tablet computer, a desktop computer, an industrial computer, a smart watch, etc., but the type of the electronic apparatus 100 is not limited thereto. The electronic apparatus 100 includes an input device 110, a battery device 120, a storage device 130, a controller 140, a display 150, and a processor 160.

In order to allow the user to interact with the electronic apparatus 100, the electronic apparatus 100 includes the input device 110 and the display 150. The input device 110 may include a microphone, a keyboard, a mouse, a touch device, etc., to receive a user input. The display 150 provides a display function to display images, and may include a liquid crystal display (LCD), a light-emitting diode (LED) display, a field emission display (FED), an organic light-emitting diode (OLED) display or other types of displays, but the disclosure is not limited thereto.

The battery device 120 is a smart battery device with an internal control chip (not shown), which may communicate with the operating system of the electronic apparatus 100 via a data bus (for example, a system management bus (SMBus)). Specifically, the battery device 120 may provide battery information to the processor 160 via the data bus for the processor 160 to perform power management according to the battery information. The battery information is, for example, data that supports the Smart Battery Data Specification (SBD Specification). In an embodiment, the operation of reading the battery information of the battery device 120 is performed by the controller 140, and the controller 140 is coupled between the processor 160 and the battery device 120. After the controller 140 receives a command from the processor 160, the controller 140 reads the battery information (for example, remaining power data) of the battery device 120 at the time, and then provides the battery information to the processor 160. The controller 140 may be, for example, an embedded controller (EC) in the electronic apparatus 100.

The storage device 130 is configured to store data such as files, images, commands, program codes, and software components, and may be, for example, any type of fixed or movable random access memory (RAM), read-only memory (ROM), flash memory, hard disk or other similar devices, integrated circuit and combinations thereof.

The processor 160 is coupled to the input device 110, the battery device 120, the storage device 130, the controller 140, and the display 150 to control the operations of the components of the electronic apparatus 100, and may be, for example, a central processing unit (CPU), a programmable general-purpose or special-purpose microprocessor, a digital signal processor (DSP), a programmable controller, an application specific integrated circuit (ASIC), a programmable logic device (PLD), other similar devices or a combination of these devices. The processor 160 may execute program codes, software modules, commands, etc. recorded in the storage device 130 to realize the power management method according to the embodiment of the disclosure.

However, in addition to the input device 110, the battery device 120, the storage device 130, the controller 140, the display 150, and the processor 160, the electronic apparatus 100 may further include other components not shown in FIG. 1, such as a speaker, a communication component, a graphics processor, an external storage device, etc., which are not particularly limited.

Figure 2:
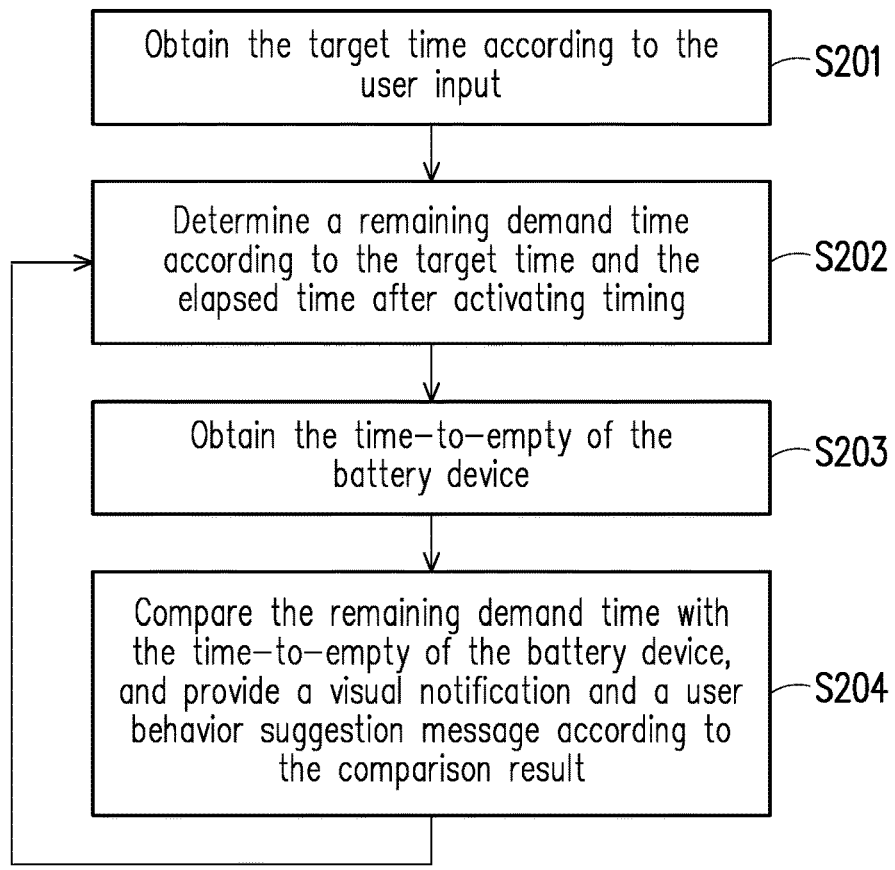
FIG. 2 is a flowchart of a power management method according to an embodiment of the disclosure.

FIG. 2 is a flowchart of a power management method according to an embodiment of the disclosure. The power management method of the embodiment is adapted to the electronic apparatus 100 of FIG. 1. The following describes the steps of the power management method with reference to the components in the electronic apparatus 100. However, each process of the power management method may be adjusted according to the situation and is not limited to the description provided here.

In step S201, a user input is received via the input device 110, and the processor 160 obtains a target time according to the user input. Specifically, in an embodiment, the display 150 may display a user interface for the user to interact with the user interface via the input device 110. In an embodiment, the user may input the target time in the user interface for the processor 160 to obtain the target time. The target time is a period of time determined by the user according to actual needs, such as 30 minutes, 1 hour, 2 hours, etc. In other words, the user expects the remaining power of the battery device 120 to support the electronic apparatus 100 to operate for the target time.

In step S202, the processor 160 determines a remaining demand time according to the target time and an elapsed time after activating timing. Specifically, after setting the target time, the processor 160 activates timing. During the timing, the processor 160 may subtract the elapsed time after activating timing from the target time to obtain the remaining demand time. For example, if the target time is 1 hour, and 20 minutes have elapsed after activating timing, the remaining demand time is 40 minutes (that is, 1 hour minus 20 minutes).

In step S203, the processor 160 obtains a time-to-empty (TimeToEmpty, TTE) of the battery device 120. In an embodiment, the time-to-empty of the battery device 120 is determined according to an average current value of the battery device 120. The average current value is an average discharge current value measured on a specific resistor inside the battery device 120 (which may also be called an average current consumption value). The average discharge current value reflects the total power consumption of the system. For example, the battery device 120 may calculate the time-to-empty according to the current remaining power and the average discharge current value of the battery device 120. In an embodiment, the processor 160 may give a command to the battery device 120 via the controller 140 to drive the battery device 120 to report the time-to-empty. In an embodiment, the processor 160 may give a command to the battery device 120 via the controller 140 to drive the battery device 120 to report relevant battery parameters required for calculating the time-to-empty, for the processor 160 to calculate the time-to-empty. For example, as shown in Table 1, the controller 140 may control the battery device 120 to report relevant battery parameters according to a command specified in the SBD Specification (for example, Smart Battery Data Specification version 1.1). Nevertheless, Table 1 is merely an example, and is not intended to limit the disclosure. In this example, the average current corresponding to the command code "0x0b" may be a positive value or a negative value. When the average current is a positive value, it represents the average charge current value. When the average current is a negative value, it represents the average discharge current value. The time-to-empty in the embodiment of the disclosure is calculated according to the average discharge current value.

TABLE 1

| Battery parameters | Command code | unit |
| --- | --- | --- |
| Voltage (Voltage) | 0x09 | mV |
| Average current (AverageCurrent) | 0x0b | mA |
| Remaining power (RemainingCapacity) | 0x0f | mAh |
| Time-to-empty (TimeToEmpty) | 0x12 | minutes |

In step S204, the processor 160 compares the remaining demand time with the time-to-empty of the battery device 120, and provides a visual notification and a user behavior suggestion message according to the comparison result. The user behavior suggestion message includes at least one power saving operation. Specifically, when the time-to-empty is less than the remaining demand time, it means that the remaining power of the battery device 120 does not allow the electronic apparatus 100 to continue to operate to the time point desired by the user based on the current operating state. Therefore, in response to that the time-to-empty is less than the remaining demand time, the processor 160 may provide the user behavior suggestion message and the corresponding visual notification. Thereby, the user sees the visual notification to know the current power state, and the user is allowed to adjust the user behavior with reference to the power saving operation in the user behavior suggestion message.

In an embodiment, the visual notification may include a text notification or a light notification. For example, the processor 160 may control the display 150 to actively display a text notification. Alternatively, the processor 160 may control a light device of the electronic apparatus 100 to generate a corresponding light effect. Furthermore, in an embodiment, the at least one power saving operation includes closing an idle application, lowering the display brightness of the display 150, lowering the volume of the speaker, turning off a communication function or removing an external storage device, which are operations for saving power. In other words, the user may refer to the user behavior suggestion message to determine how to adjust the operating state of the electronic apparatus 100 so as to minimize the influence on the user's use of the electronic apparatus 100 while prolonging the time-to-empty.

In an embodiment, after step S204, the processor 160 may perform step S202, step S203 and step S204 again to continuously confirm the comparison result of the remaining demand time and the time-to-empty of the battery device 120 and provide the corresponding visual notification. Accordingly, when the user adjusts the user behavior with reference to the user behavior suggestion message, the visual notification may actively inform the user about whether the time-to-empty is greater than the remaining demand time for the user to quickly and intuitively adjust the user behavior.

Figure 3:
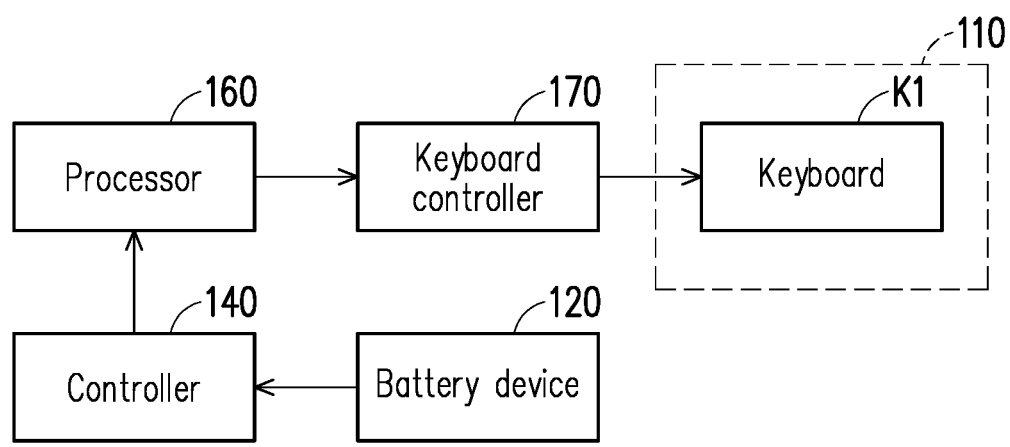
FIG. 3 is a block diagram of an electronic apparatus according to an embodiment of the disclosure.

FIG. 3 is a block diagram of an electronic apparatus according to an embodiment of the disclosure. Referring to FIG. 3, the processor 160 may control a keyboard backlight of a keyboard K1 via a keyboard controller 170. In the embodiment of FIG. 3, the operation of providing the visual notification may include controlling the keyboard backlight to emit light.

For example, the processor 160 may control the lighting color or lighting pattern of the keyboard backlight to generate different visual states. Therefore, the processor 160 may control the keyboard backlight to present different visual states according to the comparison result of the time-to-empty and the remaining demand time.

However, the embodiment of the disclosure is not limited to the foregoing description, and the content of the above embodiment may be modified according to actual needs. For example, in another embodiment of the disclosure, if the remaining demand time is continuously greater than the time-to-empty, the power consumption of the hardware devices inside the electronic apparatus 100 may be further adjusted for the time-to-empty to meet the target requirement. In addition, the electronic apparatus 100 may provide a corresponding visual notification according to a difference between the remaining demand time and the time-to-empty. Hereinafter, another embodiment will be described in detail.

Figure 4:
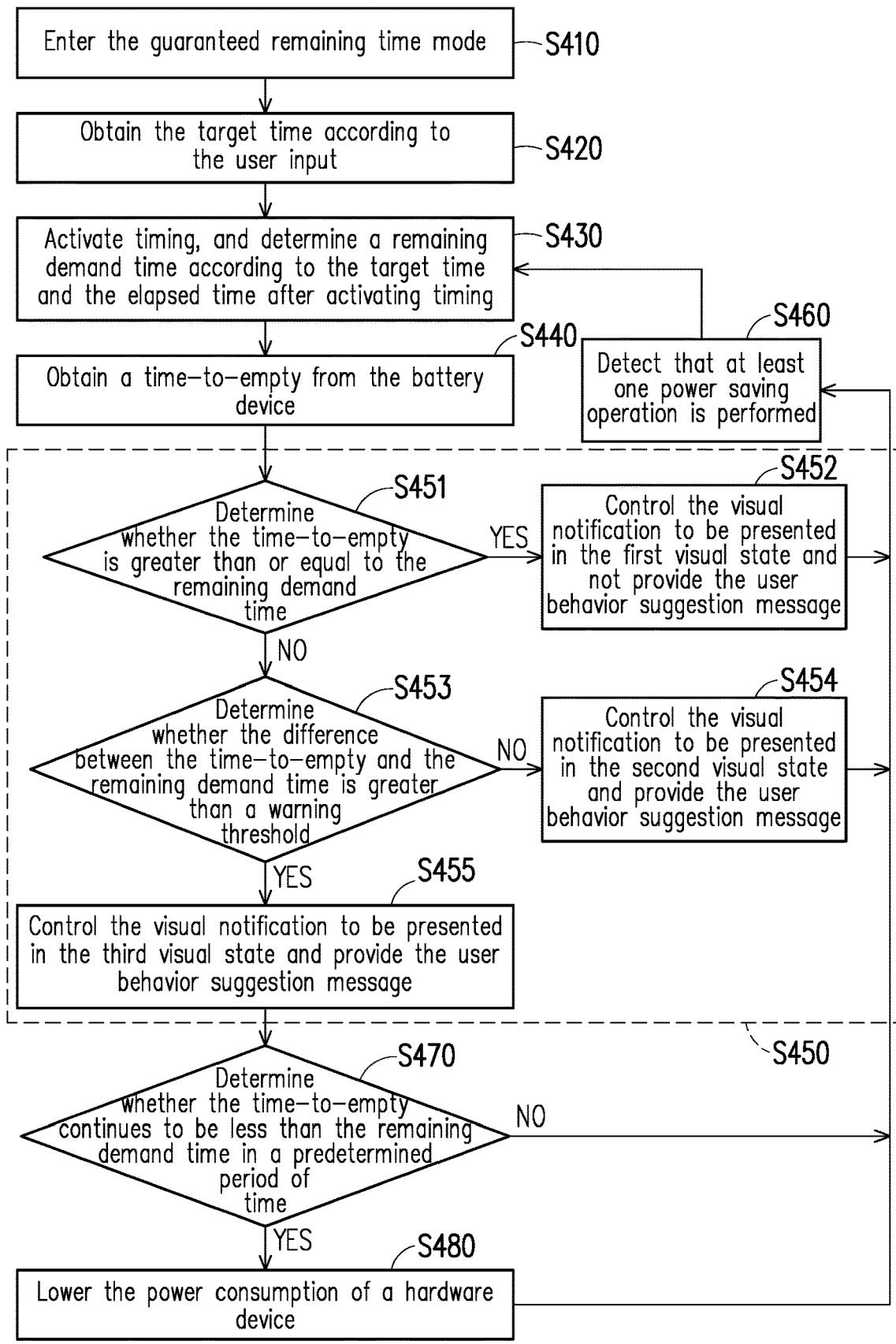
FIG. 4 is a flowchart of a power management method according to an embodiment of the disclosure.

FIG. 4 is a flowchart of a power management method according to an embodiment of the disclosure. The power management method of the embodiment is adapted to the electronic apparatus 100 of FIG. 1. The following describes the steps of the power management method with reference to the components in the electronic apparatus 100. However, each process of the power management method may be adjusted according to the situation and is not limited to the description provided here.

In step S410, the processor 160 controls the electronic apparatus 100 to enter a guaranteed remaining time mode. In an embodiment, the processor 160 may provide multiple power management modes, and the guaranteed remaining time mode is one of these power management modes. The processor 160 may control the electronic apparatus 100 to enter the guaranteed remaining time mode in response to a user operation. When the user wants to ensure that the remaining power of the battery device 120 is sufficient to complete the operation in progress, the user may control the electronic apparatus 100 to enter the guaranteed remaining time mode.

Next, in step S420, the processor 160 obtains the target time according to the user input. In step S430, the processor 160 activates timing, and determines a remaining demand time according to the target time and the elapsed time after activating timing. For example, the processor 160 activates timing in response to that the user completes inputting the target time.

In step S440, the processor 160 obtains the time-to-empty from the battery device 120. Steps S420 to S440 are similar to steps S201 to S203 of the previous embodiment, and thus will not be repeated here.

In step S450, the processor 160 compares the remaining demand time with the time-to-empty of the battery device 120, and provides a visual notification and a user behavior suggestion message according to the comparison result. In the embodiment, step S450 may be divided into sub-steps S451 to S455. In sub-step S451, the processor 160 determines whether the time-to-empty is greater than or equal to the remaining demand time.

If the time-to-empty of the battery device 120 is greater than or equal to the remaining demand time (YES in step S451), in sub-step S452, the processor 160 controls the visual notification to be presented in a first visual state and does not provide the user behavior suggestion message. Specifically, if the time-to-empty of the battery device 120 is greater than or equal to the remaining demand time, it means that the remaining power of the battery device 120 is sufficient for the electronic apparatus 100 to operate based on the current operating state until the target time elapses. Accordingly, the processor 160 does not provide the user behavior suggestion message, and controls the visual notification to be presented in the first visual state. For example, the processor 160 may control the keyboard backlight to emit green light to inform the user that the current remaining power is sufficient.

If the time-to-empty of the battery device is less than the remaining demand time (NO in step S451), the processor 160 controls the visual notification to be presented in a second visual state or a third visual state, and provides the user behavior suggestion message. Furthermore, in sub-step S453, the processor 160 determines whether the difference between the time-to-empty and the remaining demand time is greater than a warning threshold. The warning threshold is, for example, 30 minutes, but the warning threshold may be set according to actual needs and is not particularly limited.

If the difference between the time-to-empty of the battery device 120 and the remaining demand time is not greater than the warning threshold (NO in step S453), in sub-step S454, the processor 160 controls the visual notification to be presented in the second visual state and provides the user behavior suggestion message. If the difference between the time-to-empty of the battery device and the remaining demand time is greater than the warning threshold (YES in step S453), in sub-step S455, the processor 160 controls the visual notification to be presented in the third visual state and provides the user behavior suggestion message. The first visual state, the second visual state and the third visual state may be text notifications having different contents or different lighting states.

Figure 5:
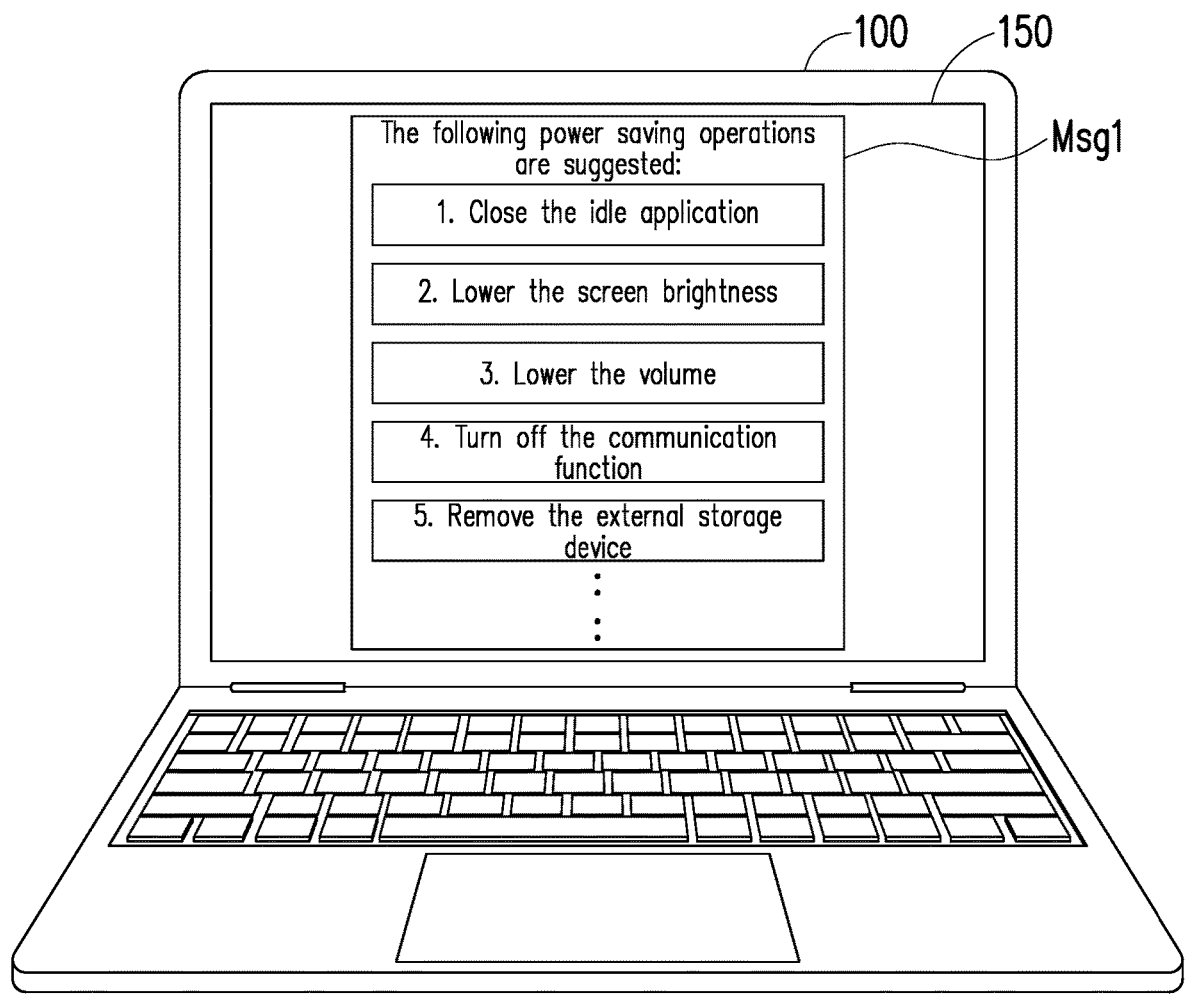
FIG. 5 is a schematic diagram of providing a user behavior suggestion message according to an embodiment of the disclosure.

For example, if the difference between the time-to-empty of the battery device 120 and the remaining demand time is not greater than the warning threshold, the processor 160 may control the keyboard backlight to emit orange light and control the display 150 to provide the user behavior suggestion message. If the difference between the time-to-empty of the battery device 120 and the remaining demand time is greater than the warning threshold, the processor 160 may control the keyboard backlight to emit red light and control the display 150 to provide the user behavior suggestion message. Thereby, the user may determine how to perform the power saving operation with reference to the user behavior suggestion message according to the color of the keyboard backlight. FIG. 5 is a schematic diagram of providing the user behavior suggestion message according to an embodiment of the disclosure. Referring to FIG. 5, the display 150 may display the user behavior suggestion message Msg1, and the user behavior suggestion message Msg1 may include multiple power saving operations. The user may determine the order of performing these power saving operations according to the color of the keyboard backlight. For example, if the keyboard backlight emits red light, the user knows that the remaining power is very insufficient, so all the power saving operations in the user behavior suggestion message Msg1 are performed. If the keyboard backlight emits orange light, the user knows that the remaining power is insufficient, so the power saving operation in the user behavior suggestion message Msg1, which is less likely to affect the current operation, is performed.

After the processor 160 provides the visual notification and the user behavior suggestion message according to the comparison result, in step S460, the processor 160 may detect that at least one power saving operation is performed, and return to step S430. Correspondingly, the time-to-empty increases in response to that at least one power saving operation is performed, and the remaining demand time decreases as the timing continues. That is, in response to detecting that the power saving operation is performed, the processor 160 may compare the time-to-empty with the remaining demand time again, and provide the corresponding visual notification. Thereby, the user may perform the power saving operations step by step to reduce the interference to the user's operation of the electronic apparatus 100.

Further, in step S470, the processor 160 determines whether the time-to-empty continues to be less than the remaining demand time in a predetermined period of time. The predetermined period of time is, for example, 10 minutes, but the predetermined period of time may be set according to actual needs and is not particularly limited. If the time-to-empty continues to be less than the remaining demand time in the predetermined period of time (YES in step S470), in step S480, the processor 160 lowers the power consumption of the hardware devices in response to that the time-to-empty continues to be less than the remaining demand time in the predetermined period of time. In an embodiment, the operation of lowering the power consumption of the hardware devices of the electronic apparatus includes lowering an operating frequency of the processor 160 or a graphics processor, or reducing the charge current provided to an external device (USB external storage device). Accordingly, before the processor 160 forcibly lowers the power consumption of the hardware devices, the user may determine how to flexibly adjust the operating state of the electronic apparatus 100 with reference to the user behavior suggestion message so as to minimize the influence on the user's use of the electronic apparatus 100 while prolonging the time-to-empty. For example, in a scenario where the user wants to use the remaining power of the battery device 120 to complete a computer game, the user may choose to turn off unnecessary applications and unnecessary communication functions first so as to prevent forced frequency reduction of the processor or graphics processor from affecting the smoothness of the game. Based on the embodiment of FIG. 4, after the processor 160 controls the visual notification to be presented in the third visual state and provides the user behavior suggestion message, the processor 160 may also automatically lower the power consumption of the hardware devices that the user cannot control.

In summary, according to the embodiments of the disclosure, the electronic apparatus actively and instantly reports whether the time-to-empty is sufficient, so that the user does not need to manually click on any battery icon. In addition, the electronic apparatus continuously and instantly reports whether the time-to-empty is greater than or equal to the time required by the user based on the operating state of the electronic apparatus, so that the user can adjust the user behavior while minimizing power consumption. Accordingly, the user may continuously perform power saving operations to ensure that the time-to-empty can meet the target requirement, thereby greatly improving the operability and user experience.

Although the disclosure has been described with reference to the above embodiments, they are not intended to limit the disclosure. Those with ordinary skill in the art can make variations and modifications without departing from the spirit and scope of the disclosure. Therefore, the protection scope of the disclosure shall be defined by the appended claims.

What is claimed is:

1. A power management method adapted to an electronic apparatus comprising a battery device and a processor, the power management method comprising:
    obtaining, by the processor, a target time inputted in a user interface by a user according to a user input received via an input device;
    activating timing by the processor to obtain an elapsed time;
    determining a remaining demand time according to the target time and the elapsed time by the processor;
    obtaining a time-to-empty of the battery device by the processor; and
    comparing the remaining demand time with the time-to-empty of the battery device by the processor, and providing a visual notification and a user behavior suggestion message according to a comparison result by the processor, wherein the user behavior suggestion message comprises at least one power saving operation,
    wherein after comparing the remaining demand time with the time-to-empty of the battery device, and providing the visual notification and the user behavior suggestion message according to the comparison result, the power management method further comprises:
    determining whether the time-to-empty continues to be less than the remaining demand time in a predetermined period of time; and
    lowering power consumption of a hardware device of the electronic apparatus in response to that the time-to-empty continues to be less than the remaining demand time in the predetermined period of time,
    wherein comparing the remaining demand time with the time-to-empty of the battery device by the processor, and providing the visual notification and the user behavior suggestion message according to the comparison result by the processor comprises:
    determining whether the time-to-empty of the battery device is greater than or equal to the remaining demand time by the processor;
    controlling the visual notification to be presented in a first visual state and not providing the user behavior suggestion message by the processor if the time-to-empty of the battery device is greater than or equal to the remaining demand time; and
    controlling the visual notification to be presented in a second visual state or a third visual state and providing the user behavior suggestion message by the processor if the time-to-empty of the battery device is less than the remaining demand time,
    wherein controlling the visual notification to be presented in the second visual state or the third visual state and providing the user behavior suggestion message by the processor if the time-to-empty of the battery device is less than the remaining demand time comprises:
    determining whether a difference between the time-to-empty and the remaining demand time is greater than a warning threshold by the processor; and
    controlling the visual notification to be presented in the third visual state and providing the user behavior suggestion message by the processor if the difference between the time-to-empty of the battery device and the remaining demand time is greater than the warning threshold.

2. The power management method according to claim 1, wherein after comparing the remaining demand time with the time-to-empty of the battery device by the processor, and providing the visual notification and the user behavior suggestion message according to the comparison result by the processor, the power management method further comprises:
    detecting that the at least one power saving operation is performed by the processor, wherein the time-to-empty increases in response to that the at least one power saving operation is performed.

3. The power management method according to claim 1, wherein an operation of lowering the power consumption of the hardware device of the electronic apparatus comprises: lowering an operating frequency of a processor or a graphics processor or reducing a charge current provided to an external device by the processor.

4. The power management method according to claim 1, wherein controlling the visual notification to be presented in the second visual state or the third visual state and providing the user behavior suggestion message by the processor if the time-to-empty of the battery device is less than the remaining demand time further comprises:
    controlling the visual notification to be presented in the second visual state and providing the user behavior suggestion message by the processor if the difference between the time-to-empty of the battery device and the remaining demand time is not greater than the warning threshold.

5. The power management method according to claim 1, wherein the time-to-empty of the battery device is determined according to an average discharge current value of the battery device.

6. The power management method according to claim 1, wherein an operation of providing the visual notification comprises controlling a keyboard backlight to emit light by the processor.

7. The power management method according to claim 1, wherein the at least one power saving operation comprises closing an idle application, lowering a display brightness of a display, lowering a volume of a speaker, turning off a communication function or removing an external storage device.

8. An electronic apparatus, comprising:
    an input device receiving a user input;
    a battery device;
    a storage device; and
    a processor coupled to the input device, the battery device and the storage device, and configured to:
        obtain a target time inputted in a user interface by a user according to the user input received via a input device;
        activate timing to obtain an elapsed time;
        determine a remaining demand time according to the target time and the elapsed time;
        obtain a time-to-empty of the battery device; and
        compare the remaining demand time with the time-to-empty of the battery device, and provide a visual notification and a user behavior suggestion message according to a comparison result, wherein the user behavior suggestion message comprises at least one power saving operation, wherein after the processor provides the visual notification and the user behavior suggestion message according to the comparison result, the processor is configured to: determine whether the time-to-empty continues to be less than the remaining demand time in a predetermined period of time; and lower power consumption of a hardware device of the electronic apparatus in response to that the time-to-empty continues to be less than the remaining demand time in the predetermined period of time, wherein the processor is configured to:

determine whether the time-to-empty of the battery device is greater than or equal to the remaining demand time;

control the visual notification to be presented in a first visual state and not provide the user behavior suggestion message if the time-to-empty of the battery device is greater than or equal to the remaining demand time;

control the visual notification to be presented in a second visual state or a third visual state and provide the user behavior suggestion message if the time-to-empty of the battery device is less than the remaining demand time;

determine whether a difference between the time-to-empty and the remaining demand time is greater than a warning threshold; and control the visual notification to be presented in the third visual state and provide the user behavior suggestion message if the difference between the time-to-empty of the battery device and the remaining demand time is greater than the warning threshold.

9. The electronic apparatus according to claim 8, wherein after the processor provides the visual notification and the user behavior suggestion message according to the comparison result, the processor is configured to: detect that the at least one power saving operation is performed, wherein the time-to-empty increases in response to that the at least one power saving operation is performed.

10. The electronic apparatus according to claim 8, wherein an operation of lowering the power consumption of the hardware device of the electronic apparatus comprises: lowering an operating frequency of a processor or a graphics processor or reducing a charge current provided to an external device by the processor.

11. The electronic apparatus according to claim 8, wherein the processor is configured to:

control the visual notification to be presented in the second visual state and provide the user behavior suggestion message if the difference between the time-to-empty of the battery device and the remaining demand time is not greater than the warning threshold.

12. The electronic apparatus according to claim 8, wherein the time-to-empty of the battery device is determined according to an average discharge current value of the battery device.

13. The electronic apparatus according to claim 8, wherein an operation of providing the visual notification comprises controlling a keyboard backlight to emit light by the processor.

14. The electronic apparatus according to claim 8, wherein the at least one power saving operation comprises closing an idle application, lowering a display brightness of a display, lowering a volume of a speaker, turning off a communication function or removing an external storage device.

* * * * *